(12) United States Patent
Chen

(10) Patent No.: US 6,809,865 B2
(45) Date of Patent: Oct. 26, 2004

(54) ITU FREQUENCY/WAVELENGTH REFERENCE

(75) Inventor: George C. K. Chen, Santa Clara, CA (US)

(73) Assignee: Fibera, Inc., Santa Clara, CA (US)

( * ) Notice: Subject to any disclaimer, the term of this patent is extended or adjusted under 35 U.S.C. 154(b) by 84 days.

(21) Appl. No.: 09/967,090

(22) Filed: Sep. 27, 2001

(65) Prior Publication Data

US 2003/0058539 A1 Mar. 27, 2003

(51) Int. Cl.$^7$ .............................. G02B 27/00; G01J 1/00
(52) U.S. Cl. ....................... 359/578; 359/579; 359/260; 356/243.1; 356/450
(58) Field of Search ................................ 359/578, 579, 359/260, 577, 634, 519; 356/243.1, 450; 372/96, 92, 20

(56) References Cited

U.S. PATENT DOCUMENTS

| | | | |
|---|---|---|---|
| 6,141,130 A | 10/2000 | Ip | 359/179 |
| 6,154,470 A | * 11/2000 | Basting et al. | 372/19 |
| 6,421,120 B1 | * 7/2002 | Wildnauer | 356/243.1 |
| 6,552,856 B1 | * 4/2003 | Chen | 359/634 |

FOREIGN PATENT DOCUMENTS

JP 401250883 A * 10/1989 .................. 356/107

OTHER PUBLICATIONS

Product Data Sheet for E–TEK titled Fabry–Perot Wavelength Locker (FPWL), 1 page.

* cited by examiner

Primary Examiner—Audrey Chang
(74) Attorney, Agent, or Firm—Raymond E. Roberts; Intellectual Property Law Offices

(57) ABSTRACT

A wavelength reference (10) including at least one gas-tunable etalons (12). Each etalon (12) has first and second reflective surfaces (20,22), making a reflecting surface pair (23). Each reflecting surface pair (23) surrounds a cavity (16) which is filled with a gas-tunable medium (19) having a variable optical index of refraction. The etalons (12) produce equally-spaced spectral lines (4) which are variable in response to changes in the gas-tunable medium (19) such as varying gas pressure or composition. The spectral lines (4) are tuned to align to an external wavelength standard, preferably an ITU reference grid (2). The properties of the gas-tunable medium (19) are then fixed, preferably by sealing an enclosure (14) which surrounds the etalons (12), so that they act as a wavelength reference (10). The etalon (12) can be a reflective etalon (29) or in an alternate embodiment (60), can be a transmissive etalon (29).

14 Claims, 4 Drawing Sheets

ITU FREQUENCY/WAVELENGTH REFERENCE

TECHNICAL FIELD

The present invention relates generally to providing a standard for calibration of optical signals and more particularly to calibrating wavelength division multiplexing of optical signals in fiber optics communications.

BACKGROUND ART

As the use of optical devices for communications and other applications increases, the need for accurate calibration of optical devices such as optical spectrum analyzers and tunable lasers has grown rapidly.

One such application that is rapidly growing in importance is that of Wavelength Division Multiplexing. Wavelength Division Multiplexing (WDM) is a way of increasing the capacity of an optical fiber by simultaneously operating at more than one wavelength within a single optical fiber. Multiple optical signals of different wavelength are transmitted in the same direction over one strand of fiber, and the signals are later separated by wavelength at the distant end. In order to establish some standards for WDM operations, the International Telecommunication Union (ITU) has proposed successive systems of standardized frequencies to be used as channels for optical telecommunications, with each system incorporating more and more channels, usually with smaller and smaller wavelength separation between the channels. This system of channels is spoken of as the "ITU grid" and currently includes 80 channels utilizing a wavelength range centered around 1550 nm (193,300 GHZ) with a channel spacing of approximately 0.4 nm (50 GHZ). There has also been a system proposed which uses channel spacing of 25 GHZ (0.2 nm). It will be easily apparent that the smaller the spacing is between channels, the more sensitive a multiplexed channel system will be to fluctuations that will cause the channel frequencies to drift away from the target grid frequencies. In a system where the frequency spacing is 100 GHz, the variation from the grid frequency of 0.01 nm (1.2 GHz) would be undesirable, but perhaps may not be disastrous. In a 50 GHz system, a 0.01 nm variation would impair the performance of the system, and in a 25 GHz system, such a deviation would likely be disabling.

Various optical devices such as wavelength meters, optical spectrum analyzers and tunable lasers all require a wavelength reference of the ITU grid in order to provide users with properly calibrated data. A random survey of calibrations conducted by the Optical Society of America indicates that the calibrations can be off from the ITU grid by as much as 0.3 nm (38 GHz). In addition, many devices have scan dependent calibration errors, meaning that calibration cannot be performed at only one or two data points, and it may not be sufficient to have one sweep rate and wavelength calibrated. Instead it may be necessary to have each parameter calibrated prior to measurement. In wavelength meter applications, the accuracy of the wavelength meter is generally unsatisfactory for 50 GHz measurements, which demand 1 μm accuracy or better. For tunable laser applications, the tunable laser should be stabilized at select ITU wavelengths. For all these applications a highly stable and accurate frequency/wavelength reference standard which is aligned with the ITU grid is highly desirable. Recently interference filters have been proposed as a solution to providing such a standard.

An interference filter is a type of tool that is often used to separate multiple wavelengths of light that are included in a beam of light. A Fabry-Perot Interferometer is one type of interference filter that is often used for wavelength filtering and separation. Interference filters operate by providing a pair of mirrored surfaces with a cavity formed between them. Incident light undergoes multiple reflections between the mirrored surfaces, which typically reflect greater than 95% of the light at each surface. The incident and reflected wave interfere with each other constructively or destructively depending on their phase relationship. Where there is no phase difference between successive waves, constructive interference is produced and a maximum is produced in the transmission portion. Where the waves are 180 degrees out of phase, destructive interference occurs and a minimum is transmitted. A maximum occurs when the round trip optical path is some integer multiple of whole wavelengths, and also depends on the thickness of the cavity (d), the index of refraction of the cavity material (n), and the angle of incidence ($\theta$), which are related by the formula:

$$2\,d\,n\,\cos\theta = m\,\lambda,$$

where m is an integer, often termed the order number and $\lambda$ is the wavelength of the light. The parallel rays of each wavelength are often focused by a lens in order to produce a familiar ring pattern. The result is a series of transmission peaks of separated wavelength. The separation distance between adjacent peaks is equally spaced when plotted with respect to inverse wavelength, and is called the Free Spectral Range (FSR).

Etalons are special Fabry-Perot interferometers which have fixed spacing between the reflective surfaces, thus the thickness of the cavity d is therefore not subject to direct parallel variation. However, the etalon may be tilted, changing the angle of the etalon relative to the angle of incidence of the light beam, which thus increases the optical path length. This allows the etalon to be "tuned" over a limited range to alter the peak transmission wavelengths.

An ITU grid 2 with 100 GHz frequency spacing 6 is shown in FIG. 1 with the fringe order pattern 4 from a Fabry-Perot interferometer using an etalon of appropriate parameters superimposed on the grid 2, the spectral lines appearing as sharp notches 8.

FIG. 2 shows an etalon as used in the prior art. The incident light strikes the etalon which has been tuned at angle $\theta$, thereby increasing the optical path length n to angle tune the etalon. However, angle tuning of an etalon introduces other problems caused by the insertion loss due to the variation in angle. Besides the difficulties of producing very tiny variations in angle, when the etalon is tuned at a small angle, the output beam can become oblong in shape, with non-uniform beam intensity distribution. As this angle increases, this effect becomes more pronounced. When optics are used to collect the output light from the etalon, a large insertion loss variation is often seen. This variation is typically from 1–4 dB.

The beam also "walks-off" from its original position due to the refraction effect of entering a medium at an angle not normal to the surface. This walk-off is of course undesirable in any system where precise positioning of the beam is important.

The variation of etalon insertion loss also commonly causes the operating point of the output spectrum to shift by as much as 10 pm (0.01 nm=1.2 GHz). As discussed above, errors of this magnitude can seriously interfere with operation of systems which use 25 Ghz frequency separations and even with 50 GHz systems.

Thus, there is a great need for a etalon which is usable in a multi-channel wavelength locking system which does not produce such large variations in insertion loss, beam quality, and wavelength shift.

DISCLOSURE OF INVENTION

Accordingly, it is an object of the present invention provide an ITU frequency/wavelength reference which produces smaller variations in insertion loss.

Another object of the present invention is to provide an ITU frequency/wavelength reference which produces smaller variations in beam quality.

An additional object of the present invention is to provide an ITU frequency/wavelength reference which produces less walk-off of the beam.

Yet another object of the present invention is to provide an ITU frequency/wavelength reference which can be used with wavelengths which are separated by as little as 25 GHz or less.

A further object of the present invention is to provide an ITU frequency/wavelength reference which has reduced manufacturing costs due to more relaxed dimensional tolerances in the parts.

A yet further object of the present invention is to provide an ITU frequency/wavelength reference which can be used as a calibration device for various applications such as wavelength meters or optical spectrum analyzers.

Briefly, one preferred embodiment of the present invention is a wavelength reference which includes one or more gas-tunable etalons. Each etalon has first and second reflective surfaces, making a reflecting surface pair. Each reflecting surface pair surrounds a cavity, the cavity being filled with a gas-tunable medium having a variable optical index of refraction. The etalons produce equally-spaced spectral lines which are variable in response to changes in the gas properties such as gas pressure or composition. The spectral lines are tuned to align to an external wavelength standard, preferably an ITU reference grid. The properties of the gas-tunable medium are then fixed, preferably by sealing an enclosure which surrounds the etalons, so that they act as a wavelength reference.

The second reflecting surfaces of the etalons can be totally reflective, or in an alternate embodiment, can be at least partially transmissive.

An advantage of the present invention is that it provides improved ITU setting repeatability for systems in which it is used.

Another advantage of the present invention is that it provides improved temperature stability.

And another advantage of the present invention is that it produces very small variations in insertion loss and beam quality.

A further advantage of the present invention is that it can be used with wavelengths which are separated by as little as 25 GHz or less.

A yet further advantage is that can provide a tunable etalon which has reduced manufacturing costs due to more relaxed dimensional tolerances in the parts.

Yet another advantage of the present invention is that it is usable as a calibration device with a number of OSA devices, such as wavelength meters, etc.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
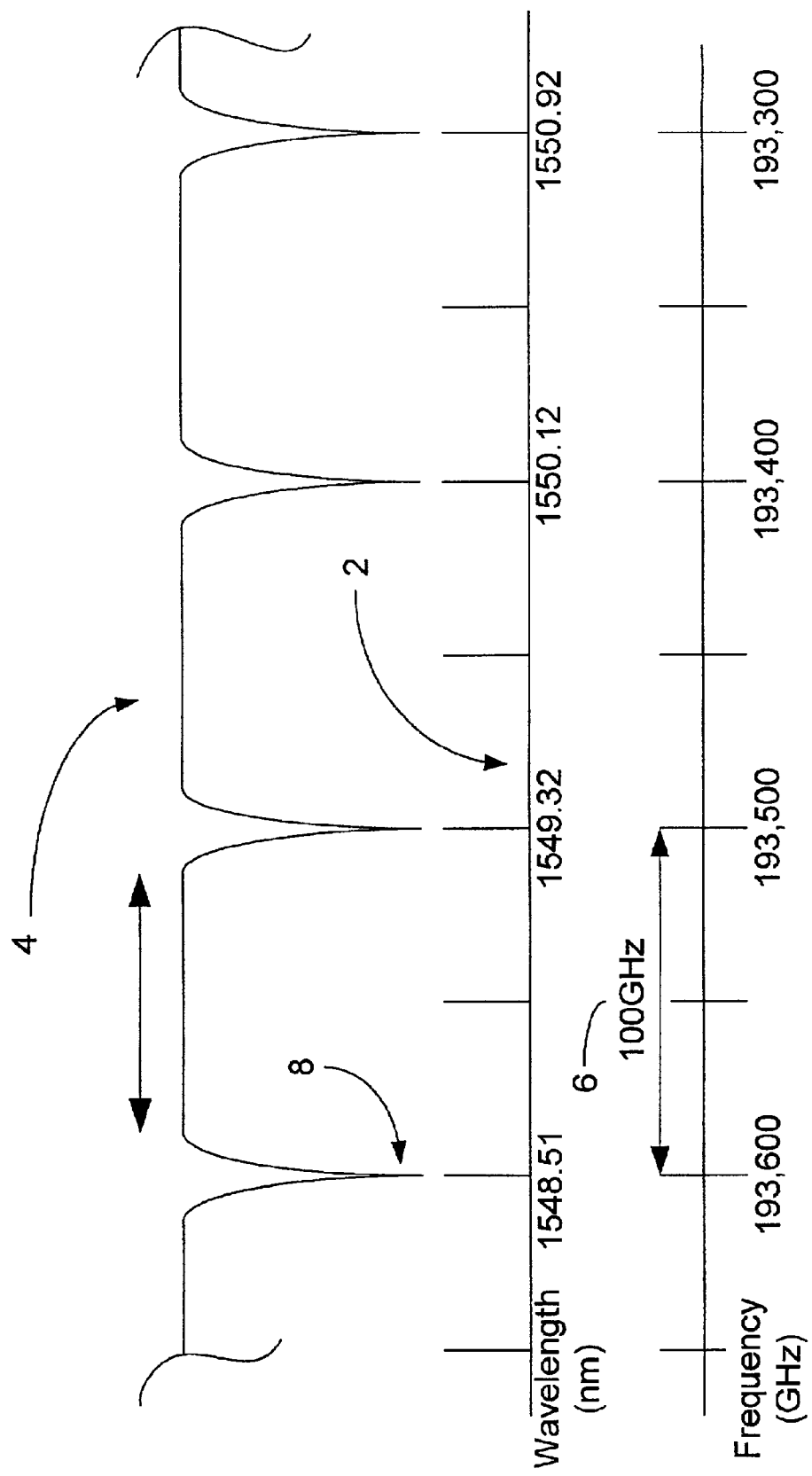
FIG. 1 shows the spectral output of the ITU grid wavelength reference of the present invention, which is used in reflection mode with 100 GHz separation, overlaid on an ITU grid.
Figure 2:
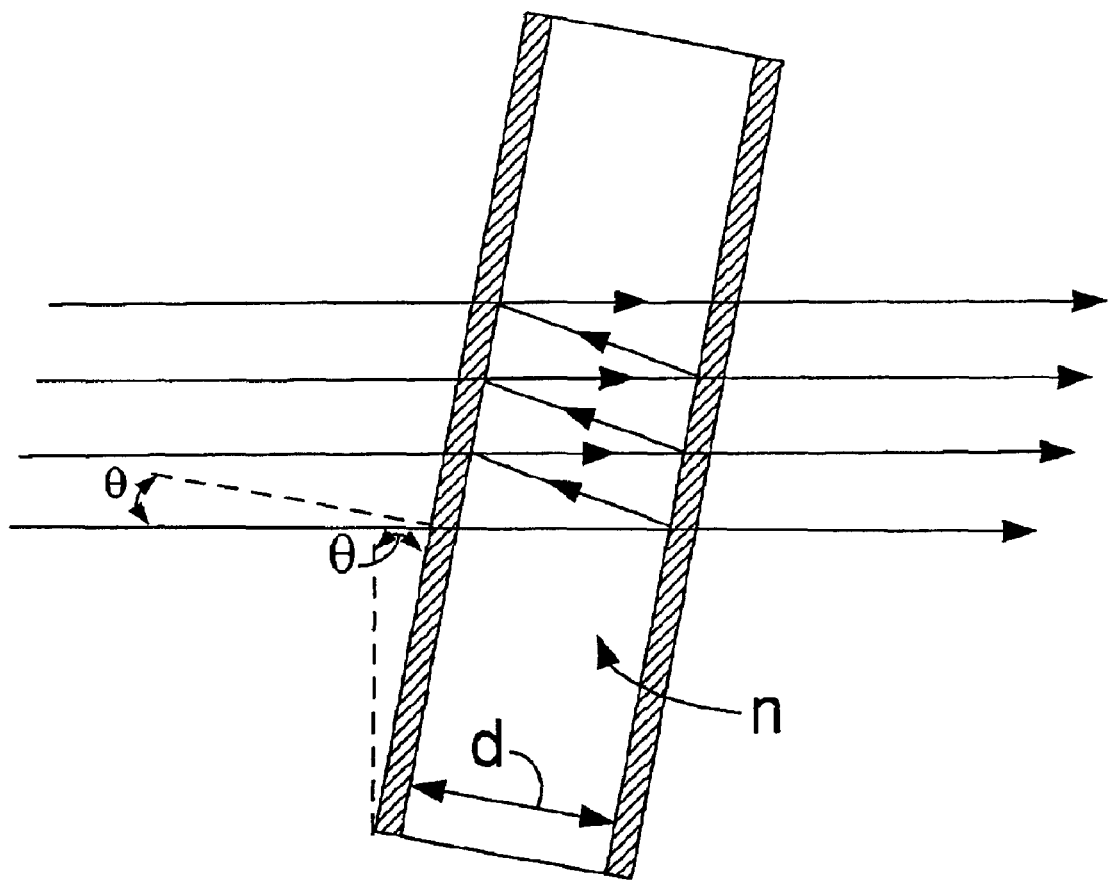
FIG. 2 shows an angle-tuned etalon of the prior art.

A preferred embodiment of the present invention is an ITU wavelength reference which uses gas tuning to align its output with the ITU reference grid. It can then be used as a calibration standard for various optical devices such as wavelength meters, optical spectrum analyzers and tunable lasers. As illustrated in the various drawings herein, and particularly in the view of FIG. 1, a form of this preferred embodiment of the inventive device is depicted by the general reference character 10 and will be referred to an ITU wavelength reference 10. It should also be understood that, the speed of light being a constant in a specified medium, when the wavelength of radiation is locked, the frequency of that radiation is necessarily locked as well. Thus, although it is possible to speak of the present invention as a "wavelength/frequency reference" or "frequency reference", for ease of reference in this application, the present invention will be called an ITU wavelength reference 10.

As discussed above, the International Telecommunication Union (ITU) has proposed systems of standardized frequencies to be used as channels for optical telecommunications, with each system incorporating more and more channels, usually with smaller and smaller wavelength separation between the channels. This system of channels is spoken of as the "ITU grid" and currently includes 80 channels utilizing a wavelength range centered around 1550 nm (193,300 GHZ) with a channel spacing of approximately 0.4 nm (50 GHZ). An ITU grid 2 with 100 GHZ frequency spacing 6 is shown in FIG. 1 with the spaced spectral lines 4 from a Fabry-Perot interferometer using an etalon of appropriate parameters superimposed on the grid 2 as a series of notches 8. The embodiment that produces this pattern of notches is one of several possible configurations that will be discussed below.

Also as discussed above, a Fabry-Perot Interferometer is one type of interference filter that is often used for wavelength filtering and separation. Interference filters operate by providing a pair of mirrored surfaces with a cavity formed between them. Incident light undergoes multiple reflections between the mirrored surfaces, which typically reflect greater than 95% of the light at each surface. The incident and reflected waves interfere with each other constructively or destructively depending on their phase relationship. Where there is no phase difference between successive wave, constructive interference is produced and a maximum is produced in the transmission portion. Where the waves are 180 degrees out of phase, destructive interference occurs and a minimum is transmitted. A maximum occurs when the round trip optical path is some integer multiple of whole wavelengths, and also depends on the thickness of the cavity (d), the index of refraction of the cavity material (n), and the angle of incidence (θ), which are related by the formula:

$$2 d n \cos \theta = m \lambda,$$

where m is an integer, often termed the order number and X is the wavelength of the light. The parallel rays of each wavelength are often focused by a lens in order to produce a familiar ring pattern. The result is a series of transmission peaks of separated wavelength, which are shown in FIG. 1 as the spaced spectral notches 8.

Figure 3:
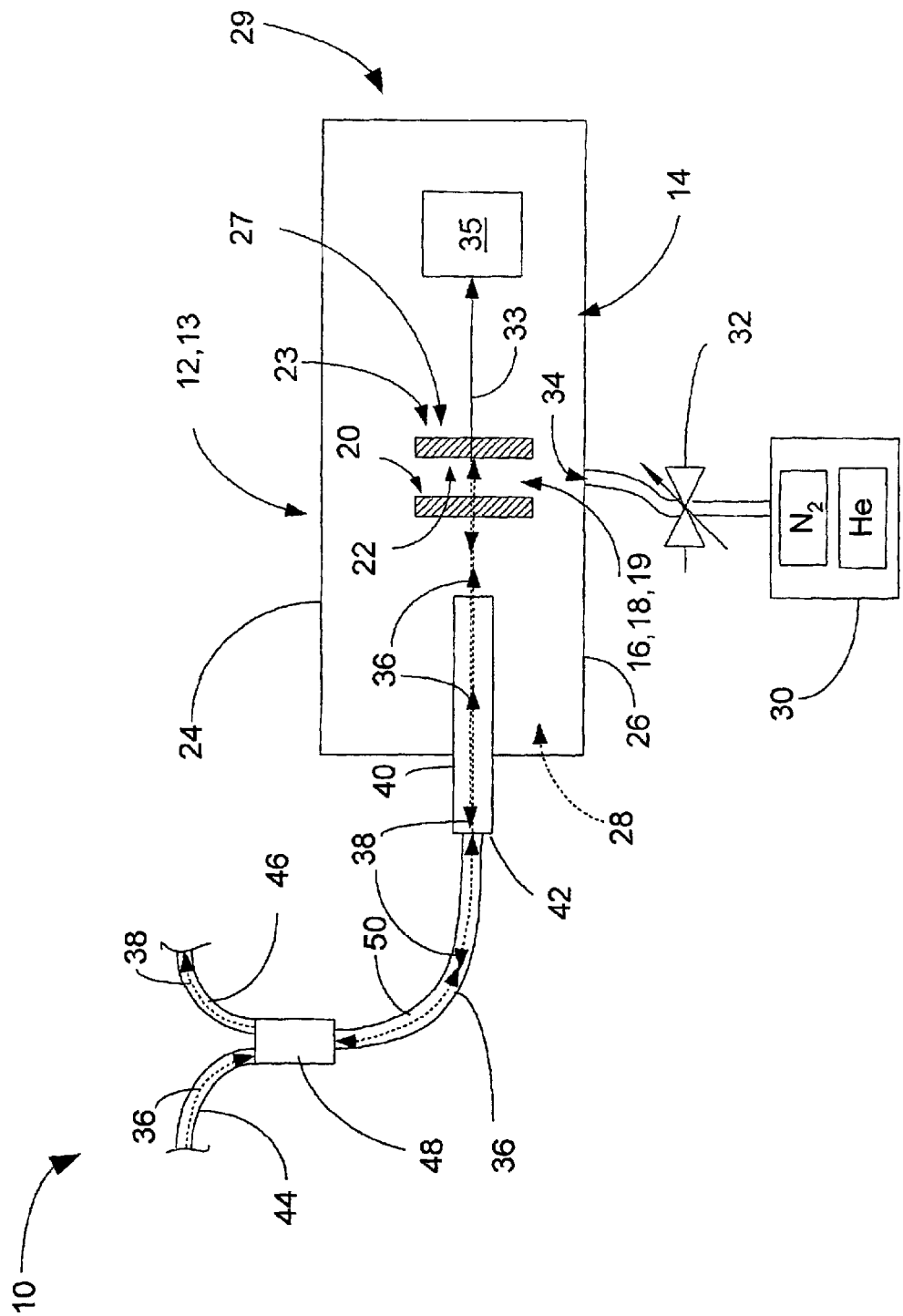
FIG. 3 illustrates an ITU grid wavelength reference of the present invention, which is a reflective etalon.

A gas-tuned etalon 12 of the ITU wavelength reference 10 of the present invention is shown in FIG. 3. The etalon 12 is a Fabry-Perot interferometer 13, and generally includes an enclosure 14, which surrounds a cavity 16. This cavity 16 includes a medium 19 of variable index of refraction, which is preferably a tuned gas 18, whose pressure or composition has been tuned to produce the appropriate index of refraction, as discussed below. The etalon 12 includes a first reflecting surface 20, a second reflecting surface 22, top wall 24, bottom wall 26, and side walls 28 to complete a gas-tight enclosure 14. The first reflecting surface 20, and second reflecting surface 22 can be thought of as a reflecting pair 23. In this embodiment, there are possibly multiple reflecting pairs 23 in a single enclosure 14, although only a single one is shown in the figure.

The incident light beam 36 enters through the input fiber 44 into a 2×2 coupler 48 and then into the fiber 50. The incident beam 36 continues into a collimator 40, and is preferably aligned to fall normal to the surface of the etalon 12. The light interferes through reflection within the etalon 12, and is returned into the collimator 40 as a reflected light beam 38. If the etalon is configured with the proper spacing and material index of refraction, interference notches are formed at regular intervals whose separation corresponds to ITU grid frequency. The etalon enclosure 14 is connected to a gas source 30 which provides gas of variable composition and pressure through a valve 32. The etalon 12 also includes an inlet 34, which is preferably sealable in a gas-tight manner. The second reflecting surface 22 in this embodiment is a mostly reflective surface 27, which the inventor estimates to be preferably 65% reflective, and thus 35% transmissive. The first reflective surface 20 is at least partially transmissive 25, so that the spectral line pattern seen in FIG. 1 is produced on the same side of the etalon 12 from the input. This form of etalon, in which the spectral line pattern is produced on the input side, shall be termed a reflective etalon 29, although it is understood that a portion of the light will also be transmitted. The residual beam 33 which passes through the second surface 22 may be captured by a beam dump 35 or left to scatter on the wall of the enclosure 14. Presently, the reflective etalon 29 is preferred because of the sharpness of the notches which are produced by the interference fringes in this mode.

Figure 4:
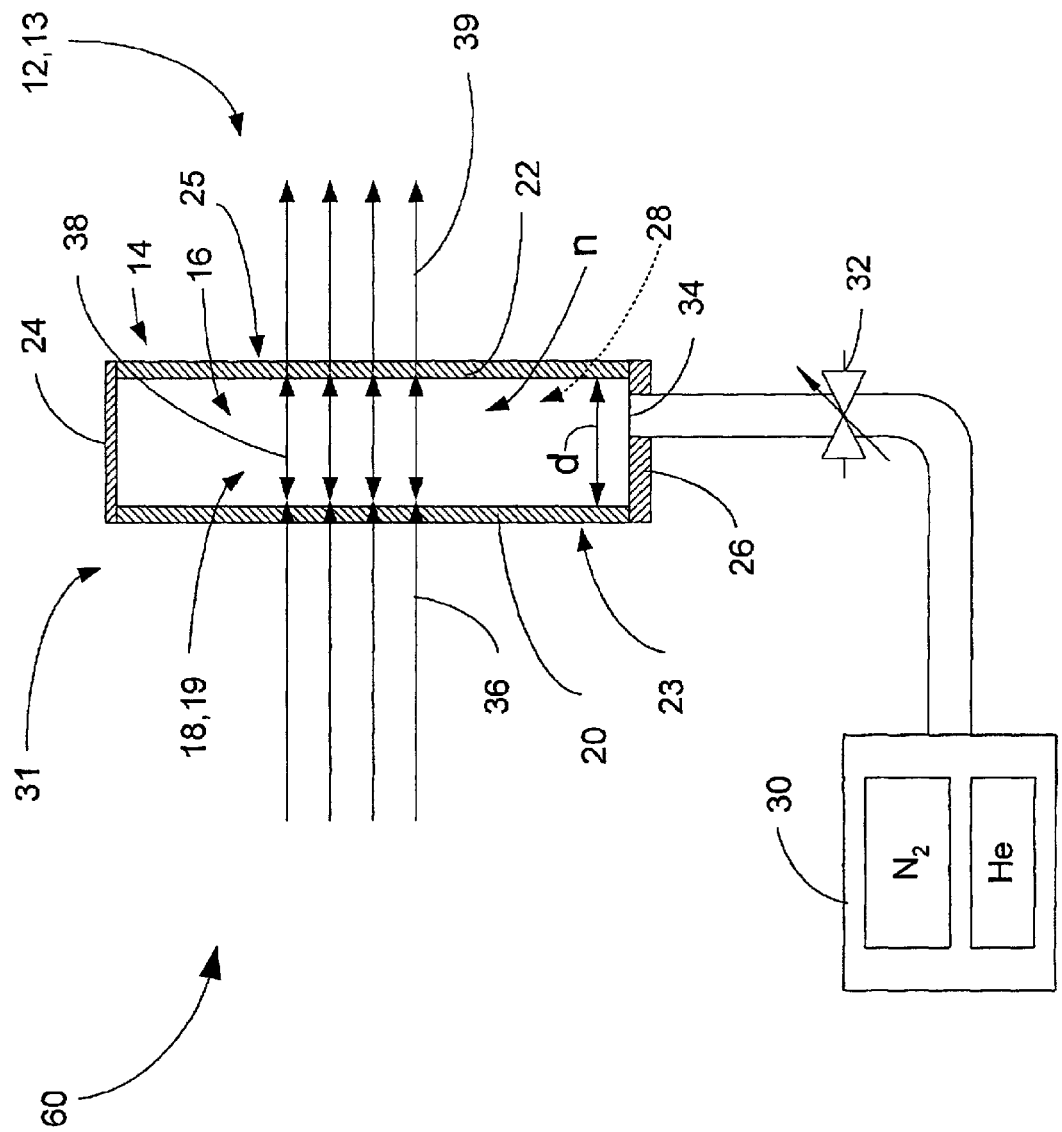
FIG. 4 illustrates an ITU grid wavelength reference of the present invention, which is a transmissive etalon.

FIG. 4 shows second embodiment 60 which includes a variation in the structure of the etalon 12, in which the light beam is only partially reflected from the second reflective surface 22, or in other words the second reflecting surface 22 is a partially reflective surface 25 with respect to the input beam. This form of etalon shall be termed a transmissive etalon 31. As before, top wall 24, bottom wall 26, and side walls 28 are included to complete a gas-tight enclosure 14.

In either of these embodiments, the enclosure 14 can enclose the etalon 12 directly with the first and second reflecting surfaces 20, 22 acting as part of the enclosure 14, as in FIG. 4, or these surfaces may be included in a larger enclosure which may include one or more etalons.

In operation, incident light beams 36 approach the etalon 12 at substantially normal incidence, and are internally reflected as reflected beams 38, and interfere with the incident light beams 36 to create an interference pattern which produces spectral lines 4 (see FIG. 1).

The spectral line pattern 4 can be adjusted to align with the ITU grid pattern by changing either cavity thickness (d), index of refraction (n), or angle (θ) in the formula $2 d n \cos \theta = m \lambda$. The thickness of the etalon is difficult to manipulate in manufactured components, and it is undesirable to change the angle, due to problems with walk-off of the beam, and distortion of the beam shape. The present inventor has taken the assertedly novel approach of varying the index of refraction (n) by tuning the properties of the material within the cavity 16. By using a medium of variable index of refraction 19 such as a gas, varying either the pressure or the composition of the gas in the cavity 16 will change the index of refraction (n), thus allowing the etalon 12 to be tuned, and the spectral lines 4 aligned with the ITU grid 2. The gas composition is preferably 90% N and 10% He but may be varied to increase the index of refraction by increasing the N concentration, or to decrease the index of refraction by decreasing it.

The pressure in the etalon 12 will of course vary slightly with temperature as the incident light beam heats the gas in the cavity, however the inventor expects that this effect will be minimal, on the order of $10^{-8}$ (UNITS). Thus the etalon 12 will be able to act as a stable and reliable reference standard for tuning various lasers or other radiation sources which are used in multi-channel operations. The pressure and/or gas composition will preferably be set at the time of manufacture, and the etalon enclosure 14 sealed before shipment to the ultimate user.

The present ITU wavelength reference 10 is made by a method of providing an etalon enclosure 14 which includes two mirrored surfaces, and charging the cavity 16 with gas of appropriate pressure until the correct index of refraction (n) is achieved. The cavity 16 is then sealed to maintain this correct index of refraction (n).

A major advantage of this method of production is that the physical tolerances on the etalon parts can be much less strict than would otherwise be necessary. In order to achieve an accuracy of 1 GHz in matching the ITU frequencies, parts would have to be made within a tolerance of 10 nm ($1 \times 10^{-9}$ m). Instead, by allowing the gas filler material in the cavity to be adjusted in pressure or composition, variations in the physical parts can be relaxed to tolerances of only $1\mu$ ($1 \times 10^6$ m) thus resulting in devices which are much less expensive.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present ITU wavelength reference 10 is well suited for application in the communications industry, or any system which uses multiplexed signals which are transmitted by fiber optics networks.

Multiple optical signals of different wavelength are transmitted in the same direction over one strand of fiber, and the signals are later separated by wavelength at the distant end in Wavelength Division Multiplexing (WDM). The International Telecommunication Union (ITU) has proposed successive systems of standardized frequencies to be used as channels for optical telecommunications, the current system including 80 channels utilizing a wavelength range centered around 1550 nm (193,300 GHZ) with a channel spacing of approximately 0.4 nm (50 GHZ). There has also been a system proposed which uses channel spacing of 25 GHZ (0.2 nm). With such small separation in the spacing between channels, a multiplexed channel system is be highly sensitive to fluctuations that will cause the channel frequencies to drift away from the target grid frequencies.

The present ITU wavelength reference 10 is able to provide accurate tuning for 25 GHz applications while allowing for much lower dimensional tolerances in the component parts. The ITU wavelength reference 10 includes an etalon 12, which is a Fabry-Perot interferometer 13, and generally includes an enclosure 14, which surrounds a cavity 16. This cavity 16 includes a medium 19 of variable index of refraction, which is preferably a tuned gas 18, whose pressure or composition has been tuned to produce the appropriate index of refraction. The etalon 12 includes a first reflecting surface 20, a second reflecting surface 22, top wall 24, bottom wall 26, and side walls 28 to complete a gas-tight enclosure 14. The etalon 12 is connected to a gas source 30 which provides gas of variable composition and pressure through a valve 32. The etalon 12 also includes an inlet 34, which is preferably sealable in a gas-tight manner. Incident light beams 36 approach the etalon 12 at substantially normal incidence, and are internally reflected as reflected beams 38, and interfere with the incident light beams 36 to create an interference pattern which produces spectral lines or notches 8. The first reflecting surface 20, and second reflecting surface 22 can be spoken of as a reflecting surface pair 23. There may be multiple reflecting surface pairs within a single enclosure 14.

The notches 8 of the spectral line pattern 4 can be adjusted to align with the ITU grid pattern 2 by changing the index of refraction (n) by tuning the properties of the material within the cavity 16. Varying either the pressure or the composition of the gas in the cavity will change the index of refraction (n), thus allowing the etalon 12 to be tuned, and the spectral notches 8 aligned with the ITU grid 2.

Once the ITU wavelength reference 10 has been tuned, the cavity 16 is sealed, and the ITU wavelength reference 10 can be used to lock the wavelengths of a number of radiation sources or for calibration of optical spectrum analyzers or other devices such as tunable lasers.

For the above, and other, reasons, it is expected that the ITU wavelength reference 10 of the present invention will have widespread industrial applicability. Therefore, it is expected that the commercial utility of the present invention will be extensive and long lasting.

2 ITU grid
4 spectral line pattern
6 100 GHz separation
8 spectral line notches
10 ITU wavelength reference
12 gas-tuned etalon
13 Fabry-perot interferometer
14 enclosure
16 cavity
18 tuned gas
19 medium of variable index of refraction
20 $1^{st}$ reflecting surface
22 $2^{nd}$ reflecting surface
23 reflecting surface pair
24 top wall
25 partially transmissive surface
26 bottom wall
27 mostly reflective surface
28 side wall
29 reflective etalon
30 gas source
31 transmissive etalon
32 valve
33 residual beam
34 inlet
35 beam dump
36 incident light beams
38 reflected light beams
39 transmitted beam
40 collimator
42 fiber input/output connector
44 input fiber
46 output fiber
48 beams of radiation
50 fiber
60 second embodiment

What is claimed is:

1. A wavelength reference comprising:
at least one gas-tunable etalon including at least one reflecting surface pair having first and second reflective surfaces; and
said reflecting surface pair surrounding a cavity, said cavity being filled with a gas-tunable medium having a variable optical index of refraction; wherein
said at least one gas-tunable etalon produces equally-spaced spectral lines which are variable in response to changes in the gas properties of said gas-tunable medium, said spectral lines being tuned to align to an external wavelength standard, and the properties of said gas-tunable medium then being fixed, so that said at least one gas-tunable etalon acts as a wavelength reference.

2. The wavelength reference of claim 1, wherein:
said etalon includes an enclosure surrounding said cavity which is filled with gas, and tuning of said etalon is done by variation in the pressure of the gas said the cavity.

3. The wavelength reference of claim 1, wherein:
said etalon includes an enclosure surrounding said cavity which is filled with gas, and tuning of said etalon is done by variation in the composition of the gas in said cavity.

4. The wavelength reference of claim 1, wherein:
said wavelength standard is the ITU grid.

5. The wavelength reference of claim 1, wherein:
said at least one etalon includes said second reflecting surface which is at least partially transmissive.

6. A method for producing a wavelength reference, comprising:
A) providing at least one etalon which includes a gas-tunable medium having an variable optical index of refraction;
B) introducing radiation into said etalon, whereby a plurality of equally spaced spectral lines is produced;
C) tuning said etalon by varying said variable optical index of refraction of said gas-tunable medium, to align said plurality of spectral lines with an external wavelength standard; and
D) fixing said variable optical index of refraction included in said etalon, so that said plurality of spectral lines produced remains substantially aligned with said external wavelength standard.

7. The method for producing a wavelength reference of claim 6, wherein:
said etalon includes an enclosure surrounding a cavity which is filled with gas, and tuning of said etalon in step C is done by varying the pressure of the gas in the cavity.

8. The method for producing a wavelength reference of claim 6, wherein:
said etalon includes an enclosure surrounding a cavity which is filled with gas, and tuning of said etalon in step C is done by variation in the composition of the gas in the cavity.

9. The method for producing a wavelength reference of claim 6, wherein:
said wavelength reference is the ITU grid.

10. The method for producing a wavelength reference of claim 6, wherein:
said at least one etalon includes a second reflecting surface which is at least partially transmissive.

11. A process for making a wavelength reference, comprising the steps of:
A) forming at least one etalon which includes a pair of reflecting surfaces and enclosure walls surrounding a cavity filled with gas of variable pressure or composition, and which produces a medium of variable optical index of refraction;
B) introducing radiation into said etalon, whereby a plurality of equally spaced spectral lines is produced;
C) tuning said etalon by varying said variable optical index of refraction, to align said plurality of spectral lines with an external wavelength standard; and
D) fixing said variable optical index of refraction included in said etalon, so that said spectral line produced remains substantially aligned with said external wavelength standard.

12. A wavelength reference produced by the process of claim 11.

13. A method for producing an ITU wavelength reference, comprising:
A) providing at least one etalon including at least one reflecting surface pair having first and second reflective surfaces, said reflecting surface pair surrounding a cavity, said cavity being filled with a gas-tunable medium having a variable optical index of refraction inside a sealable enclosure;
B) introducing a beam of incident light into said etalon, whereby at least one spectral line is produced;
C) comparing said at least one spectral line with an ITU wavelength standard;
D) tuning said etalon by varying pressure in said etalon to adjust said variable optical index of refraction to align said at least one spectral line with said ITU wavelength standard; and
E) fixing said variable optical index of refraction included in said etalon by sealing said sealable enclosure, so that said at least one spectral line produced remains substantially aligned with said ITU wavelength standard.

14. A method for producing an ITU wavelength reference, comprising:
A) providing at least one etalon including at least one reflecting surface pair having first and second reflective surfaces, said reflecting surface pair surrounding a cavity, said cavity being filled with a gas-tunable medium having a variable optical index of refraction inside a sealable enclosure;
B) introducing a beam of incident light into said etalon, whereby at least one spectral line is produced;
C) comparing said at least one spectral line with an ITU wavelength standard;
D) tuning said etalon by varying the gas composition in said etalon to adjust said variable optical index of refraction to align said at least one spectral line with said ITU wavelength standard; and
E) fixing said variable optical index of refraction included in said etalon by sealing said sealable enclosure, so that said at least one spectral line produced remains substantially aligned with said ITU wavelength standard.

* * * * *